United States Patent
Chang et al.

(10) Patent No.: US 7,052,764 B2
(45) Date of Patent: *May 30, 2006

(54) SHAPED ARTICLES COMPRISING POLY[(TRIMETHYLENE-CO-DIANHYDRO-SUGAR ESTER) DICARBOXYLATE] OR POLY(TRIMETHYLENE-CO-DIANHYDRO-DICARBOXYLATE WITH IMPROVED STABILITY

(75) Inventors: Jing-Chung Chang, Boothwyn, PA (US); Joseph V. Kurian, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 371 days.

This patent is subject to a terminal disclaimer.

(21) Appl. No.: 10/459,830

(22) Filed: Jun. 10, 2003

(65) Prior Publication Data

US 2004/0121116 A1 Jun. 24, 2004

Related U.S. Application Data

(60) Provisional application No. 60/434,599, filed on Dec. 19, 2002.

(51) Int. Cl.
*B32B 3/02* (2006.01)
*C08F 20/00* (2006.01)
*C08G 63/66* (2006.01)

(52) U.S. Cl. ............... 428/364; 525/444; 525/437; 524/483; 528/279; 528/283; 528/293; 528/295; 528/295.3; 528/298; 528/299; 528/300; 528/302; 528/306; 528/308; 528/308.6

(58) Field of Classification Search ............... 428/85, 428/97, 359, 364, 369, 373; 442/199, 181, 442/327, 361; 524/483; 525/444; 528/279, 528/283, 213, 295, 295.3, 298, 299, 300, 528/302, 306, 308, 308.6, 437
See application file for complete search history.

(56) References Cited

U.S. PATENT DOCUMENTS

| | | | |
|---|---|---|---|
| 5,912,307 A | 6/1999 | Paschke et al. | |
| 5,958,581 A | 9/1999 | Khanarian et al. | |
| 5,959,066 A | 9/1999 | Charbonneau et al. | |
| 6,063,464 A | 5/2000 | Charbonneau et al. | |
| 6,063,465 A | 5/2000 | Charbonneau et al. | |
| 6,063,495 A * | 5/2000 | Charbonneau et al. | 428/364 |
| 6,166,170 A | 12/2000 | Putzig | |
| 6,368,710 B1 * | 4/2002 | Hayes | 428/364 |
| 6,406,648 B1 * | 6/2002 | Noel et al. | 264/46.4 |
| 6,656,577 B1 * | 12/2003 | Adelman et al. | 428/221 |
| 6,737,481 B1 * | 5/2004 | Kurian et al. | 525/444 |

OTHER PUBLICATIONS

DuPont Tyzor Organic Titanates, General Brochure (2001).
DuPont Tyzor Organic Titanates, Technical Note—Grade Chart (2001).
DuPont Tyzor Organic Titanates, Technical Note—Grade Selection Chart (2001).

* cited by examiner

*Primary Examiner*—Norca Torres
*Assistant Examiner*—Matthew Matzek
(74) *Attorney, Agent, or Firm*—Nancy S. Mayer; Mark D. Kuller

(57) ABSTRACT

A shaped article comprising poly[(trimethylene-co-dianhydrosugar ester) dicarboxylate] or poly(trimethylene-co-dianhydro-dicarboxylate having improved stability in the form of less change of Tg and reduced shrinkage upon storage at elevated temperature is disclosed.

36 Claims, 1 Drawing Sheet

SHAPED ARTICLES COMPRISING POLY[(TRIMETHYLENE-CO-DIANHYDRO-SUGAR ESTER) DICARBOXYLATE] OR POLY(TRIMETHYLENE-CO-DIANHYDRO-DICARBOXYLATE WITH IMPROVED STABILITY

RELATED U.S. APPLICATION

This application is a non-provisional of provisional U.S. Application Ser. No. 60/434,599, filed Dec. 19, 2002, now abandoned.

FIELD OF THE INVENTION

The present invention is directed to shaped articles, particularly fibers, having increased stability comprising poly (alkylene-co-dianhydrosugar ester) dicarboxylate or poly (alkylene-co-dianhydro-dicarboxylate).

BACKGROUND OF THE INVENTION

Charbonneau et al. in U.S. Pat. No. 6,063,464 have shown that incorporation of dianhydrosugar alcohols, such as 1,4:3,6-dianhydrosorbitol, hereinafter referred to by its trivial name "isosorbide", can significantly raise the glass transition temperature ($T_g$) of terephthalate polyesters, such as poly(1,3-propanediol terephthalate). Poly(1,3-propanediol terephthalate), also known as poly(trimethylene terephthalate), is hereinafter abbreviated as 3GT. The relatively low glass transition temperature (Tg) of 3GT (~45–50° C.) can lead to slight tackiness of the polymer when stored at high temperatures. An instance of this is sometimes evidenced on spools of fiber stored in warehouses in the hot weather of tropical countries. An increase in Tg lowers tack. Additionally, the low Tg leads to instability in spun fibers when stored under hot conditions. Partially drawn fibers under such storage conditions tend to undergo crystallization, forming a denser phase and causing fiber shrinkage, changes in denier and other undesirable changes in physical properties on storage. However, esterification of isosorbide with terephthalic acid or transesterification with dialkyl terephthalates involves the reaction of secondary hydroxyls and is slow compared with reaction of primary glycols such as ethylene glycol or 1,3-propylene glycol. This tends to lead to inefficient incorporation of the isosorbide. Using conventional condensation polymerization, this lower reactivity can lead to final polyesters that have lower molecular weights since unreacted isosorbides are detrimental to subsequent polymerization.

Adelman et al. U.S. Ser. No. 10/172,112, published as US 2003-0232960 A1, have described process improvements for the preparation of poly(1,3-propylene-co-isosorbide) terephthalate, hereinafter abbreviated as 3GIT. However, the secondary hydroxyl groups of the Isosorbide with the dibasic acid or its dialkyl ester have much lower reactivity than the corresponding reactivity of the primary hydroxyl groups of the 1,3-propane diol. This difference in reactivity has a number of effects, one of which is to lengthen the time needed for the solid phase polymerization step, a final procedure wherein the inherent viscosity of the polymer is increased to about 1.1 dl/g for good spinning properties.

It is desirable to prepare polyesters incorporating dianhydrosugar alcohols, such as 3GIT, with a low level of color and a Tg higher than the 45–50° C. Tg of 3GT, and, most importantly, both a low level of color and a higher Tg. Such improved properties aid in the use of such polyesters in shaped articles in many markets, including beverage bottles, film or sheet, fibers, monofilaments, and optical articles (e.g., compact discs or digital versatile discs).

It is particularly desired to increase the stability of shaped articles comprising polyesters having dianhydrosugar alcohols incorporated therein, particularly fibers and yarns such as partially oriented yarns, spun drawn yarns, and bulked continuous filament yarns, as well as staple fibers, to permit use of high speed spinning processes, without deterioration of the filament and yarn properties. It is further desired for these yarns to be useful in preparing products, such as textured yarns, fabrics and carpets, under the same or similar conditions to those used for yarns prepared at slower speeds.

The present invention provides shaped articles comprising ester-modified dicarboxylate polymers having such improved stability.

SUMMARY OF THE INVENTION

The present invention comprises a shaped article comprising poly(alkylene-co-dianhydrosugar ester) dicarboxylate or poly(alkylene-co-dianhydro-dicarboxylate). The article is a fiber, yarn, film, nonwoven, or molded article. The fiber is staple or filament and a homopolymer or multifilament. The fiber is in the form of a partially oriented yarn, spun drawn yarn, or spun textured yarn.

The present invention further comprises a fabric or carpet prepared from such fiber.

DETAILED DESCRIPTION OF THE INVENTION

Figure 1:
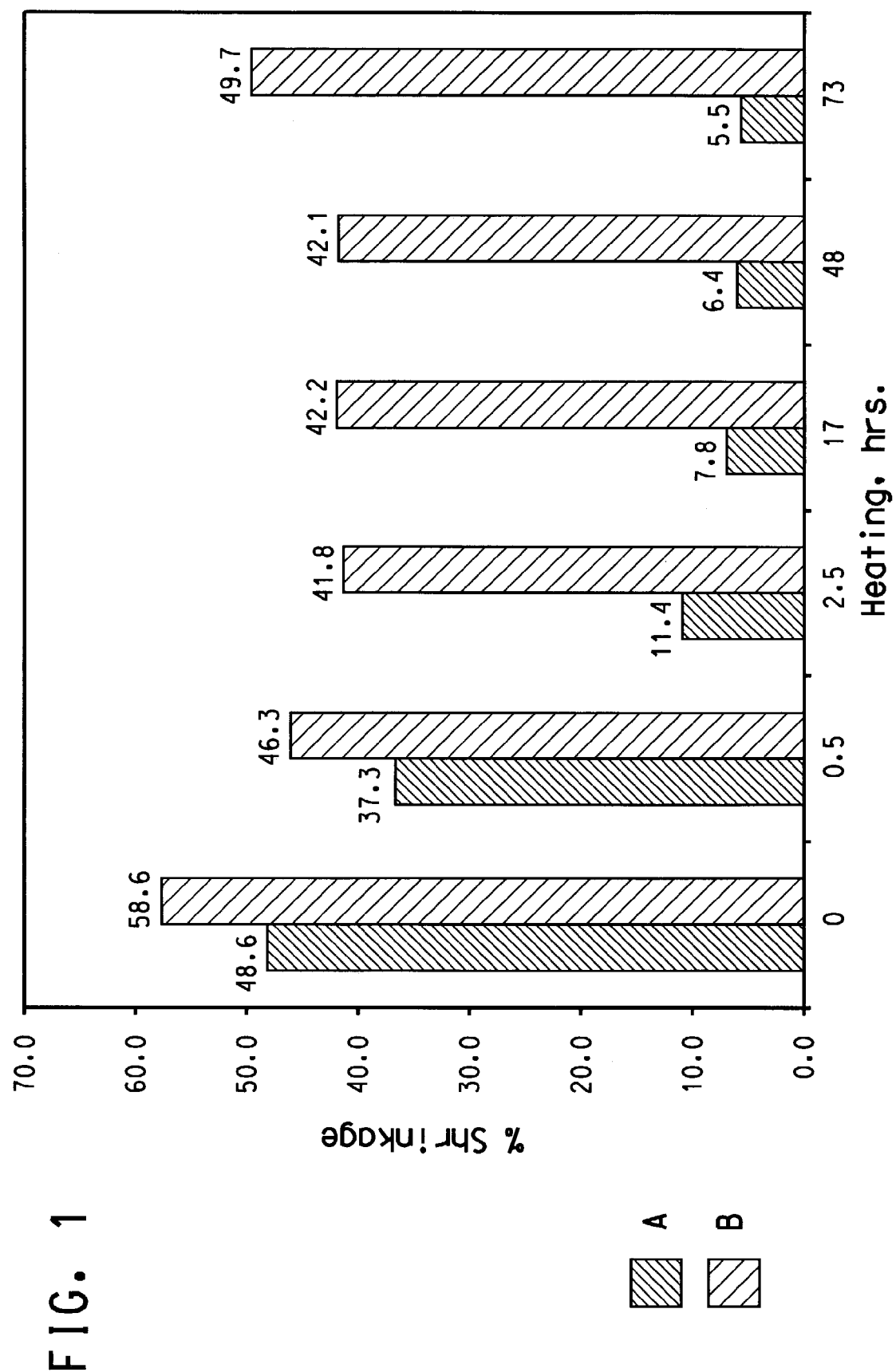
FIG. 1 depicts a graph of the percentage of fiber shrinkage of its original length versus heating time in hours at 41° C. of a composition of Example 1 of the present invention containing isosorbide, denoted as B, versus a control composition of Comparative Example A without the isosorbide, denoted as A.

The present invention comprises ester-modified dicarboxylate polymers in the form of shaped articles having increased stability. In particular, the polymers are polyesters having incorporated therein esters of dianhydrosugar alcohols. Preferred are poly[(alkylene-co-dianhydrosugar ester) terephthalate] or poly(alkylene-co-dianhydro-terephthalate). 1,4:3,6-dianhydrosorbitol, a diol monomer, is referred to herein as isosorbide. Poly(1,3-propanediol terephthalate) is referred to as 3GT. Poly(1,3-propylene-co-1,4:3,6-dianhydro-D-sorbitol terephthalate) is referred to as 3GIT. Di-1,3-propylene glycol is referred to as DPG. 1,3-propylene glycol is also referred to as 1,3-propanediol or "3G". Trademarks are shown in upper case.

Structural stability is important in a variety of shaped articles, especially in fibers (partially oriented yarns). Enhanced structural stability is achieved due to an increased Tg that in turn results from the inclusion of an anhydrosugar alcohol moiety in a polyester. The ester-modified dicarboxylate polymers used in the shaped articles of the present invention are prepared by two methods for the introduction of anhydro- or dianhydrosugar alcohol into the polymer. Embodiment 1 introduces the anhydrosugar directly into a poly(alkylene-co-dianhydrosugar dicarboxylate). Embodiment 2 utilizes a preformed ester bridging moiety to facilitate the introduction of the anhydrosugar into a polyester.

In the first embodiment, the polymers are prepared from monomers comprising an alkylene diol, preferably 1,3-propane diol; a sugar alcohol anhydride or dianhydride, preferably isosorbide; a dicarboxylic acid, preferebly terephthalic acid, or its alkyl esters; and optionally other diols and diacids or diesters. The preferred 3GIT polymer contains at least about 3 and preferably at least about 4 mole % of isosorbide units based on the 3GIT. It contains up to about 20 mole %, more preferably up to about 15 mole %, even more preferably up to about 12 mole %, and most preferably up to about 10 mole % isosorbide units, based on the 3GIT.

The 3GIT polymers are prepared from terephthalic acid or its alkyl ester, 1,3-propane diol, and isosorbide. The reaction mixture can contain small amounts of other reactants. Diacids or diesters can be used in amount up to about 15 mole %, preferably no more than 10 mole %, and most preferably no more than 2 mole %, based on the total 3GIT. Examples include isophthalic acid, 1,4-cyclohexane dicarboxylic acid, 2,6-naphthalene dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids. Small amounts of trifunctional acids may also be employed, e.g., 1,3,5-benzenetricarboxylic acid.

Similarly, up to 15 mole %, preferably no more than 10 mole %, and most preferably no more than 2%, of other 3 to 12 carbon atoms aliphatic diols may be used in place of the 1,3-propanediol. Examples include diols having the empirical formula HO—$(C_nH_{2n})$—OH, where n is an integer from 2–12, for example, ethanediol, 1,4-butanediol, 1,5-pentanediol, 1,6-hexanediol, and 1,10-decanediol. Also included are branched diols such as 2,2-dimethyl-1,3-propanediol; cis or trans-1,4-cyclohexanedimethanol and mixtures of the cis and trans isomers; 2,2,4,4-tetramethyl-1,3-cyclobutanediol; triethylene glycol; 2,2-bis[4-(2-hydroxyethoxy)phenyl] propane; 1,1-bis[4-(2-hydroxyethoxy)phenyl]cyclohexane; 9,9-bis[4-(2-hydroxyethoxy)phenyl]fluorene. Preferred diol moieties are derived from ethylene glycol, butylene glycol, propylene glycol and cyclohexanedimethanol. Small amounts of alcohols with functionality greater than 2 may also be utilized, e.g., trimethylolpropane and pentaerythritol.

In addition, up to 15 molar equivalents %, preferably no more than 10 molar equivalents %, and most preferably no more than 2 molar equivalents %, of other anhydrosugar alcohols may be used based on isosorbide. Examples of other anhydrosugar alcohols include 1,4:3,6-dianhydromannitol; 1,4:3,6-dianhydroiditol; and 1,4-anhydroerythritol.

A catalyst is required for polycondensation. It is added at any time. Polycondensation catalysts that are used include salts of Li, Ca, Mg, Zr, Mn, Zn, Pb, Sb, Sn, and Ti, such as acetate salts and oxides, including glycol adducts, and Ti alkoxides and chelates. The preferred catalysts are Sb(III) salts; Ti(IV) salts; acetate salts of Co(II), Zn(II) or Sb(II); alkanoate salts of Co(II) or Sb(III); oxides of Sb(II), Sb(III) or Ge(IV); glycol-solubilized oxides of Sb(II), Ge(IV) or Sb(III); ortho titanate esters (preferably Ti(OR)$_4$ where R is an alkyl group having 2 to 12 carbon atoms, such as tetrabutyltitanate or tetraisopropyltitanate); solvent-based chelated organic titanates (e.g., TYZOR AA or TE catalysts (E. I. du Pont de Nemours and Company, Wilmington, Del.)); aqueous based chelated organic titanates (e.g., TYZOR LA catalyst (E. I. du Pont de Nemours and Company, Wilmington, Del.) or catalysts such as those described by Putzig, in U.S. Pat. No. 6,166,170 which is incorporated herein by reference); ortho zirconate esters (preferably Zr(OR)$_4$ is an alkyl group having 2 to 12 carbon atoms, such as tetra-n-propyl zirconate or tetra-n-butyl zirconate (E. I. du Pont de Nemours and Company)); solvent-based chelated organic zirconates; and aqueous-based chelated organic zirconates; and combinations thereof. Oxides of Ti are preferred. Useful catalysts include those described in co-pending U.S. patent application Ser. No. 10/131,910, filed Apr. 25, 2002, which is incorporated herein by reference. Most preferred are the solvent-based chelated organic titanates and aqueous based chelated organic titanates.

The preferred amount of polycondensation catalyst is generally from about 10 to 300 ppm, or more specifically the molar ratio of catalyst to terephthalic acid is about 1:1,000 to about 1:7,300, preferably at least about 1:2,200 and preferably up to about 1:4,400.

A catalyst can also be used to enhance esterification or transesterification, and polycondensation catalysts are particularly useful in transesterification. The polycondensation catalysts described above also can be used to catalyze transesterification and can be present during direct esterification. Catalysts known in the art as useful in catalyzing esterification reactions, such as tin and zinc catalysts, can also be used. Catalysts can be added to the mixture and/or at any appropriate stage of the process.

The molar ratio of diols (preferably 1,3-propanediol and isosorbide) to dicarboxylic acid (preferably terephthalic acid) or its alkyl ester is from about 1.1:1 to about 1.6:1, preferably at least about 1.2:1 and preferably up to about 1.4:1. The molar ratio of diol, preferably 1,3-propanediol, to dianhydrosugar alcohol, preferably isosorbide, is from about 2:1 to about 10:1, preferably at least about 4:1 and preferably up to about 8:1. When the other diols, anhydrosugar alcohols, diacids or diesters are used, they should replace an equivalent number of moles of diol (1,3-propanediol and isosorbide) or terephthalic acid or its alkyl ester to yield the same molar ratios.

The color of the poly(alkylene-co-dianhydrosugar ester) dicarboxylate can be improved using coloring agents, preferably dyes and/or pigments. Color is commonly expressed in terms of Hunter numbers which correspond to the lightness or darkness ("L*") of a sample, the color value ("a*") on a red-green scale, and the color value ("b*") on a yellow-blue scale, and which are measured as described below. It is usually desired to produce polymers with "L*" at least 70. Similarly, for low color polymers, "a*" and "b*" are preferably less than about 2.0 to about −2.0. It has been found that these objectives can be met for 3GIT with the use of color-correcting additives. Any suitable coloring agent can be used alone or in combination. For low color, it is also important to eliminate, or at least minimize, the color-forming impurities present in the monomer starting materials. Preferably, the UV absorbance of 1,3-propanediol and isosorbide are less than 0.20 at 220 nm, more preferably less than 0.10.

The polymer further comprises additives selected from the group consisting of infrared absorbing agents, coloring agents, dyes, pigments, delustrants, flame retardants, and UV stabilizers. These additives can be added at any time including when the polymer is produced into shaped articles or other products. One preferred alternative is to add the infrared absorbing agents, coloring agents, dyes, pigments, delustrants, flame retardants, and/or UV stabilizers to the process after removal of at least 80% of the water derived from the condensation reaction. The infrared absorbing agent is preferably graphite or carbon black.

The polymerization process to make the polymers comprises (1) esterification or transesterification and (2) a vacuum polycondensation. The process can be carried out on a batch, continuous or semi-continuous basis. The esterification or transesterification is typically carried out at a temperature in the range of about 180 to about 245° C., under an inert atmosphere, and at ambient pressure. The eliminated water or alkanol is distilled from the reaction mixture through a fractionating column that returns the diol and dianhydrosugar alcohol to the reaction. When most of the water or alkanol (at least about 80%) has distilled, the pressure is reduced to complete removal of water and alkanol, and to distill off excess diol. The term polycondensation is used to describe the process where oligomers are condensed to form polymer, with removal of diol, dianhydrosugar alcohol, and water. A polycondensation catalyst is necessary at this stage, and with any other desired additives that are optionally added at this stage, such as infrared absorbing agents, coloring agents, dyes, pigments, delustrants, flame retardants, UV stabilizers and other thermally stable additives. The reaction mixture is held under vacuum while being heated under agitation until the desired intrinsic viscosity (IV) is reached, typically for about 1 to about 6 hours. As the IV increases, the melt viscosity also increases. Minimizing time at high temperatures also helps to minimize color generation. Typically, once the IV has reached a value of at least about 0.5 dl/g, more preferably at least about 0.6 dl/g, polycondensation is completed.

Solid state polymerization can be used to raise the IV of the polymer made during polycondensation as described by Charbonneau in U.S. Pat. No. 6,063,464, which is incorporated herein by reference. The polymer from either the free acid or ester process is removed from the reactor at the end of the polycondensation stage and isolated in any of several conventional processes as strands, pellets or flake. If not sufficiently crystalline, the isolated polymer, preferably 3GIT, can be crystallized by heating it to a temperature in the range of about 80° C. to about 120° C. The crystallized polymer is heated under vacuum or in a stream of inert gas at an elevated temperature of about 190° C. (typically 170° C. to 195° C.) but below the melting temperature of the crystallized polymer to yield a solid state polymerized product. In solid state polymerization, heating under vacuum is continued to raise the IV from about 0.8 to about 1.1 dl/g for many end-uses.

In the second embodiment, the poly[(alkylene-co-dianhydrosugar ester)] dicarboxylate polymers are prepared by first contacting a dianhydrosugar alcohol with an acid or a dialkyl ester to yield an ester (hereinafter denoted as a bridging moiety), followed by polycondensing said bridging moiety with a polyalkylene dicarboxylate oligomer. The bridging moiety has the structure of formula 1

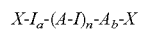  Formula 1 wherein:
A is the ester residue from an anhydrosugar alcohol or dianhydrosugar alcohol,
I is the ester residue from a diacid or its dialkyl esters,
X is H when linked to an A residue, OH when linked to an I residue derived from a dibasic acid, and OR when linked to an I residue derived from a dialkyl ester of the dibasic acid,
R is a C1–C4 straight or branched chain alkyl group,
a and b are independently 0 or 1, and
n is 1 to 10.

The ester residue from the alcohol is the alcohol with the hydrogens of the hydroxyl groups removed. The ester residue from the diacid is the diacid with the hydroxyl groups removed.

One example of a bridging monomer having a=0, b=0 and n is 1 to 10, has the structure of Formula II below, and is prepared by reacting isosorbide with isophthalic acid or a dialkylisophthalate.

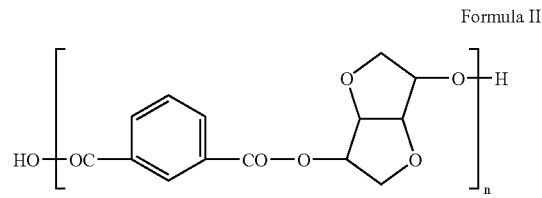

Formula II

The bridging moiety of Formula II is typically a mixture of the above esters with n having a value of 1 to about 10, with the ester having n=1 predominating.

The procedure of the second embodiment avoids the problems created by the slow reaction rate for direct esterification or transesterification of isosorbide with terephthalic acid or dimethylterephthlate, as described in the first embodiment. This significantly improves the incorporation of dianhydrosugar alcohol into polyester by preparing a preformed bridging moiety. The bridging moiety is prepared by the esterification of a diacid or the transesterification of an ester of a diacid with a sugar alcohol anhydride or dianhydride, preferably isosorbide.

The bridging moiety is then subjected to polycondensation by mixing with a poly(alkylene ester) oligomer under an inert gas atmosphere and heating the molten mixture at 210 to 280° C., and preferably 240 to 260° C., and at a pressure of less than about 0.4 mm Hg (0.05 kPa) until the intrinsic viscosity (IV) reaches at least about 0.8 dl/g, typically for 1 to 2 hours. Catalysts and additives may be added as for the first embodiment above.

Unreacted dianhydrosugar alcohol is removed during the vacuum heating and should be minimized for the polycondensation step. During the polycondensation step, performed on the molten sample, the intrinsic viscosity and molecular weight increase to maximum equilibrium levels. Finally, the intrinsic viscosity of the polymer of Embodiment 2 is raised to about 1.2 dl/g or above by solid phase polymerization under nitrogen as described for Embodiment 1.

The diacid groups in the bridging moieties include, but are not limited to those derived from naphthalates, terephthalates, isophthalates, and benzoates. Specific examples of the diacid groups include isophthalic acid, phthalic acid, 2,5-furandicarboxylic acid, 2,5-thiophenedicarboxylic acid, 2,6-naphthalenedicarboxylic acid, 2,7-naphthalenedicarboxylic acid, 3,4'- and 4,4'-diphenyl ether dicarboxylic acid, 3,4'- and 4,4'-diphenyl sulfide dicarboxylic acid, 3,4'- and 4,4'-diphenylsulfone dicarboxylic acid, 3,4'- and 4,4'-benzophenonedicarboxylic acid, 1,4-naphthalenedicarboxylic acid, 4,4'-methylene bis(cyclohexyl)dicarboxylic acid, trans-1,4-cyclohexanedicarboxylic acid, cis-1,4-cyclohexanedicarboxylic acid, 1,2-bis(4-carboxyphenoxy)ethane, 4,4'-methylene-bis(benzoic) acid, trans-4,4'-stilbenedicarboxylic acid, fumaric acid, dimer acid, resorcinoldiacetic acid, and sulfoisophthalic acid, and 4,4'-bibenzoic acid. The diacid does not need to be derived from terephthalic acid or dimethyl terephthalate or from other compounds containing a terephthaloyl moiety. Small amounts of multifunctional acids or anhydrides may also be employed, e.g., 1,3,5-benzenetricarboxylic acid, pyromellitic acid and pyromellitic dianhydride. Further, by "aromatic" and "alicyclic", it is meant to include substituted aromatic or alicyclic compounds, e.g., aromatic compounds substituted with an aliphatic group. The preferred diacid moiety is isophthalic acid.

The anhydro or dianhydrosugar alcohols groups in the bridging moieties include, but are not limited to, isosorbide, 1,4:3,6-dianhydromannitol; 1,4:3,6-dianhydroiditol; and 1,4-anhydroerythritol. The preferred dianhydrosugar alcohol group is isosorbide.

The bridging monomers are prepared by heating the diacid and dianhydrosugar alcohol, in the presence of a catalyst. The procedure, here described for isophthalic acid and isosorbide, involves heating a 0 to 100 mole % excess of isosorbide, and preferably a 20 to 40 mole % excess of isosorbide, with isophthalic acid in the presence of about 90-140 micrograms/g tin in the form of a suitable catalyst, such as n-butylstannoic acid under an inert gas atmosphere. The temperature is about 210 to 290° C., and preferably 240 to 260° C. Water is evolved. A clear solution is obtained after about 30 min. and heating is continued until no further water evolves, typically for about 1 to 2 hours, indicating the end of the esterification reaction.

The molar ratio of dianhydrosugar alcohol:dialkyl ester is preferably about 1.4:1. The stirred mixture is heated to about 250° C. under a nitrogen purge, when alcohol (methanol in the specific case where dimethylisophthalate is used) starts to evolve. Heating and stirring at 250° C. is continued until no more alcohol evolves (typically for about 2 more hours), indicating completion of the transesterification reaction.

In both the diacid and dialkyl ester routes, unreacted dianhydrosugar alcohol can be immediately removed by heating under vacuum if desired, but typically this is preferably removed during the subsequent polycondensation.

The bridging moiety formed as above is then subjected to polycondensation by mixing a poly(alkylene ester) prepolymer or oligomer with 0.5 to 50%, preferably 2 to 20%, and most preferably 4 to 10% of the bridging monomer, based on the weight of the poly(alkylene ester) prepolymer. The prepolymer is preferably poly(alkylene terephthalate). The poly(alkylene terephthalate) prepolymer has an inherent viscosity of from about 0.02 to about 0.06 dl/g, and is preferably poly(1,3-propylene terephthalate) oligomer. It is important that polyester prepolymers contain less than 1% by weight, as measured by NMR, of unreacted diol, since such unreacted diol interferes with the transesterification processes occurring during polycondensation. Unreacted diol can be removed by vacuum stripping, or by grinding up the prepolymer, extracting the diol with water, and drying. Catalyst, in the form of an alkyl titanate, in the amount of 10 to 200 micrograms/g of titanium, based on the weight of the prepolymer/bridging monomer mix is added. Under an inert gas atmosphere, the mixture is heated molten at about 210 to 290° C., and preferably 240 to 260° C., and a pressure of less than about 0.4 mm Hg (0.05 kPa) until the intrinsic viscosity (IV) reached at least 0.8 dl/g, typically for 1 to 2 hours. Unreacted dianhydrosugar alcohol is removed during the vacuum heating. During the polycondensation step, performed on the molten sample, the intrinsic viscosity (and molecular weight) increase to a maximum equilibrium level.

Any yellowish tint in the product can be corrected using coloring agents, preferably dyes and/or pigments, as described for embodiment one above. For low color product, it is also important to eliminate, or at least minimize, the color-forming impurities present in the monomer starting materials. Preferably, the UV absorbance of the starting materials is less than 0.20 at 220 nm, more preferably less than 0.10 at 220 nm.

The polymer further comprises additives selected from the group consisting of infrared absorbing agents, coloring agents, dyes, pigments, delustrants, flame retardants, and UV stabilizers. These additives can be added at any time including when the polymer is produced into shaped articles or other products.

After the polycondensation step, measurements on the resulting polymer compared with a control sample not containing any dianhydrosugar alcohol showed its incorporation provided a higher glass transition temperature ($T_g$) and higher cold crystallization temperature ($T_{cc}$), providing significant value for several end-use applications in fibers, films, surfaces, and engineering thermoplastic components. Both the glass transition temperature ($T_g$) and cold crystallization temperature ($T_{cc}$) increase with the increase of dianhydrosugar alcohol units in the polymer.

The intrinsic viscosity of the polycondensed polymer product, about 0.8 dl/g, is too low for optimum properties for fabrication of some final products, such as spun fibers. Consequently, the polycondensation products is then subjected to solid phase polymerization at a temperature about 20° C. below the melting point (at about 190° C.) in a vacuum oven at about 300 mm Hg (39 kPa) under a slow nitrogen stream. The specific temperature is based on the melting point of the polycondensed product. At or below a final IV of about 0.85, the polymer shows poor fiber properties. A final IV of about 1.2 or above creates processing and spinning problems.

In other embodiments of the present invention, the bridging moieties can be subjected to polycondensation with various polyester oligomers, including but not limited to poly(ethylene terephthalate), poly(trimethylene terephthalate), poly(tetramethylene terephthalate), and poly(alkylene 1,4-cyclohexanedicarboxylate) and similar oligomers.

The final polycondensed polymer, termed poly[(alkylene-co-dianhydrosugar ester) dicarboxylate], produced by the polycondensation of the bridging moieties of the present invention with poly(alkylene ester) prepolymers, are used as starting materials in the manufacture of shaped articles.

In another embodiment of the present invention, the poly[(alkylene-co-dianhydrosugar ester) dicarboxylate] of the structure of Formula 1 also includes copolymers containing at least 30 mole % poly[(alkylene-co-dianhydrosugar ester) dicarboxylate] units. The preferred polymers contain at least 85 mole %, more preferably at least 90 mole %, even more preferably at least 95 or at least 98 mole %, and most preferably about 100 mole %, poly[(alkylene-co-dianhydrosugar ester) dicarboxylate] repeat units.

The poly[(alkylene-co-dianhydrosugar ester) dicarboxylate] compositions of the present invention contain three monomers, the alkylene diol, the anhydrosugar alcohol ester, and dicarboxylic acid. In another embodiment, copolymers may include copolyesters made using 4 or more reactants, each having two ester forming groups. For example, a copoly[(alkylene-co-dianhydrosugar ester) dicarboxylate] can be used in which the comonomer used to make the copolyester is selected from the group consisting of linear, cyclic, and branched aliphatic dicarboxylic acids having 4–12 carbon atoms (for example butanedioic acid, pentanedioic acid, hexanedioic acid, dodecanedioic acid, and 1,4-cyclo-hexanedicarboxylic acid); aromatic dicarboxylic acids other than terephthalic acid and having 8–12 carbon atoms (for example isophthalic acid and 2,6-naphthalenedicarboxylic acid); linear, cyclic, and branched aliphatic diols having 2–8 carbon atoms (other than 1,3-propanediol, for example, ethanediol, 1,2-propanediol, 1,4-butanediol, 3-methyl-1,5-pentanediol, 2,2-dimethyl-1,3-propanediol, 2-methyl-1,3-propanediol, and 1,4-cyclohexanediol); and aliphatic and aromatic ether glycols having 4–10 carbon atoms (for example, hydroquinone bis(2-hydroxyethyl) ether, or a poly(ethylene ether) glycol having a molecular weight below about 460, including diethyleneether glycol). The comonomer typically is present in the copolyester at a level in the range of about 0.5-about 15 mole %, and can be present in amounts up to 30 mole %.

In yet another embodiment, the poly[(alkylene-co-dianhydrosugar ester) dicarboxylate] is blended with up to 30 mole percent of other polymers. Examples are polyesters prepared from other diols, such as those described above. The preferred poly[(alkylene-co-dianhydrosugar ester) dicarboxylate contain at least 85 mole %, more preferably at least 90 mole %, even more preferably at least 95 or at least 98 mole %, and most preferably about 100 mole %, poly[(alkylene-co-dianhydrosugar ester) dicarboxylate] polymer.

The ester-modified dicarboxylate polymers are formed into a variety of shaped articles including fiber, yarn, film, nonwoven, or molded article using or adapting conventional processes. Of particular interest is use of the polymers in providing fibers and yarns having enhanced stability when stored at high temperatures. The fibers are monofilament or multiconstituent filament. The enhanced stability permits use of higher spinning speeds in manufacturing operations.

The shaped articles of the present invention have a Tg of at least 55, preferably at least 60, and more preferably at least 70. The high Tg contributes to the stability of the article when stored at warm temperatures. The shaped articles have an IV of from about 1.5 to about 2.5.

By "multiconstituent filament" is meant a filament formed from at least two polymers, one of which forms a continuous phase and the others being in one or more discontinuous phases dispersed throughout the fiber, wherein the at least two polymers are extruded from the same extruder as a blend.

The invention enables manufacture of filaments that can be used in subsequent processing operations under similar conditions to those used with yarns prepared at lower speeds. The polymers used in the invention are useful in a process for preparing multifilament yarn, comprising spinning at a speed of at least 2500 m/m.

The shaped articles of the present invention comprise partially oriented yarns. Partially oriented yarns of poly(trimethylene terephthalate) are described in U.S. Pat. Nos. 6,287,688 and 6,333,106, and U.S. Patent Publication No. 2001/30378, all of which are incorporated herein by reference. The basic steps of manufacturing partially oriented yarns including spinning, interlacing and winding filaments are described therein. This invention can be practiced using those steps or other steps conventionally used for making partially oriented polyester yarns; however, it provides the advantage of carrying out the process with stable package and yarn properties.

Preferably, prior to spinning the polymer is heated to a temperature above its melting point and extruded through a spinneret and at a temperature of about 235 to about 295° C. Higher temperatures are useful with low residence time.

The partially oriented yarns are multifilament yarns. The yarns (also known as "bundles") preferably comprise at least about 10 and even more preferably at least about 25 filaments, and typically can contain up to about 150 or more, preferably up to about 100, more preferably up to about 80 filaments. Yarns containing 34, 48, 68 or 72 filaments are common. The yarns typically have a total denier of at least about 5, preferably at least about 20, preferably at least about 50, and up to about 1,500 or more, preferably up to about 250.

Filaments are preferably at least about 0.5 dpf, more preferably at least about 1 dpf, and up to about 10 or more dpf, more preferably up to about 7 dpf. Typical filaments are about 3 to 7 dpf, and fine filaments are about 0.5 to about 2.5 dpf.

Spin speeds can run from about 1,800 to about 8000 or more meters/minute ("m/m"), and are preferably at least about 2,000 m/m, more preferably at least about 2500 m/m.

Partially oriented yarns are usually wound on a package, and are used to make woven or nonwoven fabrics or further processed into other types of yarn, such as textured yarn. They can also be stored in a can prior to preparing fabrics or further processing, or can be used directly without forming a package or other storage.

The shaped articles of the present invention also comprise spun drawn yarn. The preferred steps of manufacturing spun drawn yarns including spinning, drawing, optionally and preferably annealing, optionally interlacing, and winding the filaments for the ester-modified terephthalate polymers used herein are similar to those used for preparing poly(ethylene terephthalate) yarns.

Preferably, prior to spinning, the polymer is heated to a temperature above its melting point and extruded through a spinneret at a temperature of about 235 to about 2950° C. Higher temperatures are useful with short residence time.

These yarns are also multifilament yarns. The yarns (also known as "bundles") preferably comprise at least about 10 and even more preferably at least about 25 filaments, and typically can contain up to about 150 or more, preferably up to about 100, more preferably up to about 80 filaments. Yarns containing 34, 48, 68 or 72 filaments are common. The yarns typically have a total denier of at least about 5, preferably at least about 20, preferably at least about 50, and up to about 1,500 or more, preferably up to about 250.

Filaments are preferably at least about 0.1 dpf, more preferably at least about 0.5 dpf, more preferably at least about 0.8 dpf, and up to about 10 or more dpf, more preferably up to about 5 dpf, and most preferably up to about 3 dpf.

The draw ratio is at least 1.01, preferably at least about 1.2 and more preferably at least about 1.3. The draw ratio is preferably up to about 5, more preferably up to about 3, and most preferably up to about 2.5.

Draw speeds (as measured at the roller at the end of the draw step) can run from about 2500 or more m/m, and preferably up to about 8000 m/m. Spun drawn yarns are usually wound on a package, and are used to make woven or nonwoven fabrics or further processed into other types of yarn, such as textured yarn.

The shaped articles of the present invention also comprise textured yarns. Textured yarns can be prepared from partially oriented yarns or spun drawn yarns. The main difference is that the partially oriented yarns usually require drawing whereas the spun drawn yarns are already drawn.

U.S. Pat. Nos. 6,287,688 and 6,333,106, and U.S. Patent Publication No. 2001/30378, all of which are incorporated herein by reference, describe the basic steps of manufacturing textured yarns from partially oriented yarns. This invention can be practiced using those steps or other steps conventionally used for making partially oriented polyester yarns. The basic steps include unwinding the yarns from a package, drawing, twisting, heat-setting, untwisting, and winding onto a package. Texturing imparts crimp by twisting, heat setting, and untwisting by the process commonly known as false twist texturing. The false-twist texturing is carefully controlled to avoid excessive yarn and filament breakage.

A preferred process for friction false-twisting described in U.S. Pat. Nos. 6,287,688 and 6,333,106, and U.S. Patent Publication No. 2001/30378, and comprises heating the partially oriented yarn to a temperature between 140° C. and 220° C., twisting the yarn using a twist insertion device such that in the region between the twist insertion device and the entrance of the heater, the yarn has a twist angle of about 460 to 520 and winding the yarn on a winder. When prepared from spun drawn yarn, the process is the same except that drawing is reduced to a very low level (e.g., draw ratio can be as low as 1.01).

These textured yarns (also known as "bundles") comprise the same number of filaments as the partially oriented yarns and spun drawn yarns from which they are made. Thus, they preferably comprise at least about 10 and even more preferably at least about 25 filaments, and typically can contain up to about 150 or more, preferably up to about 100, more preferably up to about 80 filaments. The yarns typically have a total denier of at least about 1, more preferably at least 20, preferably at least about 50, and up to about 1,500 or more, preferably up to about 250.

Filaments are preferably at least about 0.1 dpf, more preferably at least about 0.5 dpf, more preferably at least about 0.8 dpf, and up to about 10 or more dpf, more preferably up to about 5 dpf, and most preferably up to about 3 dpf.

When prepared from partially oriented yarn, the draw ratio is at least 1.01, preferably at least about 1.2 and more preferably at least about 1.3. The draw ratio is preferably up to about 5, more preferably up to about 3, and most preferably up to about 2.5. Draw speeds (as measured at the roller at the end of the draw step) can run from about 50 to about 1,200 or more m/m, and are preferably at least about 300 m/m and preferably up to about 1,000 m/m.

When prepared from spun drawn yarns, speeds (as measured at the first godet the fiber contacts) can run from about 50 to about 1,200 or more m/m, and are preferably at least about 300 m/m and preferably up to about 800 m/m.

Textured yarns are used to make woven or nonwoven fabrics or other textiles.

The shaped articles of the present invention also comprise bulked continuous filaments. Bulked continuous filament ("BCF") yarns and their manufacture are described in U.S. Pat. Nos. 5,645,782 Howell et al., 6,109,015 Roark et al. and 6,113,825 Chuah; U.S. patent application Ser. Nos. 09/895,906, 09/708,209, 09/938,760 and 10/099,373; and WO 99/19557, all of which are incorporated herein by reference. BCF yarns are used to prepare all types of carpets, as well as textiles, including woven and nonwoven fabrics.

Preferred steps involved in preparing bulked continuous filaments include spinning (e.g., extruding, cooling and coating (spin finish) the filaments), single stage or multi-stage drawing (preferably with heated rolls, heated pin or hot fluid assist (e.g., steam or air)) at about 80 to about 200° C. and at a draw ratio of about 3 to about 5, preferably at least about 3.4 and preferably up to about 4.5, annealing at a temperature of about 120 to about 200° C., bulking, entangling (which can be carried out in one step with bulking or in a subsequent separate step) optionally relaxing, and winding the filaments on a package for subsequent use.

Bulked continuous filament yarns are made into carpets using well-known techniques. Typically, a number of yarns are cable twisted together and heat set in a device such as an autoclave, SUESSEN or SUPERBA, and then tufted into a primary backing. Latex adhesive and a secondary backing are then applied.

The shaped articles of the present invention comprise staple fibers. Staple fibers and products are prepared using the processes described in U.S. patent application Ser. Nos. 09/934,904 and 09/934,905, both filed Aug. 22, 2001, and WO 01/68962, WO 01/76923, WO 02/22925 and WO 02/22927, which are incorporated herein by reference. Staple fibers are prepared by melt spinning the polymer at a temperature of about 245 to about 285° C. into filaments, quenching the filaments, drawing the quenched filaments, crimping the drawn filaments, and cutting the filaments into staple fibers, preferably having a length of about 0.2 to about 6 inches (about 0.5 to about 15 cm).

One preferred process comprises: (a) providing a polymer, (b) melt spinning the melted polymer at a temperature of about 245 to about 285° C. into filaments, (c) quenching the filaments, (d) drawing the quenched filaments, (e) crimping the drawn filaments using a mechanical crimper at a crimp level of about 8 to about 30 crimps per inch (about 3 to about 12 crimps/cm), (f) relaxing the crimped filaments at a temperature of about 50 to about 120° C., and (g) cutting the relaxed filaments into staple fibers, preferably having a length of about 0.2 to about 6 inches (about 0.5 to about 15 cm). In one preferred embodiment of this process, the drawn filaments are annealed at about 85 to about 115° C. before crimping. Preferably, annealing is carried out under tension using heated rollers. In another preferred embodiment, the drawn filaments are not annealed before crimping.

Staple fibers are useful in preparing textile yarns and textile woven or nonwoven fabrics, and can also be used for fiberfill applications and making carpets.

The shaped articles of the present invention also comprise monofilaments. Preferably monofilaments are 10 to 200 dpf. Monofilaments, monofilament yarns and use thereof are described in U.S. Pat. No. 5,340,909, EP 1 167 594 and WO 2001/75200, which are incorporated herein by reference. While the invention is primarily described with respect to multifilament yarns, it should be understood that the preferences and uses described herein are applicable to monofilaments.

The filaments can be round or have other shapes, such as octalobal, delta, sunburst (also known as sol), scalloped oval, trilobal, tetra-channel (also known as quatra-channel), scalloped ribbon, ribbon, starburst, etc. They can be solid, hollow or multi-hollow.

In addition to providing more stable fibers, the poly (alkylene-co-dianhydrosugar ester) dicarboxylate polymers are useful in the manufacture of thermoplastics, shaped articles by injection molding, blow molding, extrusion and compression molding, and reactive extrusion in the manufacture of coatings, laminates and adhesives, in the manufacture of packaging and industrial films, in the manufacture of other melt processable products such as polyurethane, polyetheramide, and polyurethane urea fibers, and in the manufacture of foams and cast elastomers.

The invention is demonstrated in the following examples, which are not intended to be limiting. Therein, all percentages, parts, etc., are by weight unless otherwise indicated.

EXAMPLES

The following analytical techniques and materials were used in the examples.

Glass Transition Temperature ($T_g$)

Differential Scanning Calorimetry (DSC) was used to determine Tg values. A 10 mg sample of polymer, ground to pass a 20-mesh (7.9 cm$^{-1}$) screen, was analyzed with a TA Instruments 2920 DSC with a refrigerated cooling accessory for controlled cooling from room temperature to 280° C.

using a heating rate of 1° C./min. The sample was then held at 280° C. for two minutes, quenched in liquid nitrogen, and then reheated from room temperature to 280° C. The associated software calculated a $T_g$, $T_c$ (temperature of crystallization), and $T_m$ (melting point). Procedures for measurement of $T_g$ and melting point were used as described in the TA Instruments manual for the 2920 DSC.

Polymer Composition

Mole percent isosorbide and di-1,3-propylene glycol (DPG) content were determined by analysis of the proton NMR spectrum of 3GIT. About 20 mg of 3 GIT was dissolved in 1 mL trifluoroacetic acid-d ($CF_3COOD$, 99.5 atom %, see Materials, below). The sample was analyzed at room temperature using a Varian (Palo Alto, Calif.) 500 MHz spectrometer.

Color & Brightness

The color and brightness of the 3GIT samples were determined using a Varian (Palo Alto Calif.) Cary 5 UVN is/NIR spectrophotometer with a diffuse reflectance accessory. The reflectance data was processed using the color analysis application within Grams/32 software with an observer angle of 2 degrees and a CIE A light source. Hunter L*, a*, and b* were calculated. The L* coordinate indicated brightness, where 0 was black and 100 was white. The a* value could be positive or negative, where positive values were indicative of red color and negative indicated green. The b* value was similar, where positive values indicated yellow and negative values indicated blue.

Intrinsic Viscosity (IV)

Intrinsic viscosities were measured using a Viscotek Forced Flow Viscometer model Y-900. Polymers were dissolved in 50/50 w/w trifluoroacetic acid/methylene chloride at a 0.4% (wt/vol) concentration and were tested at 19° C. The method used is set forth in ASTM D2857.95.

Shrinkage-Tension Analyzer

The Shrinkage-Tension Analyzer was made by E. I. du Pont de Nemours and Company, Inc. (Kinston, N.C.) to analyze yarn tension and temperature relationships. The Analyzer was equipped with a temperature controller (0–600° C., from Valley Forge Instrument Company, Phoenixville, Pa.) to control the temperature of a heating chamber, a Statham Load Cell (model UL4–0.5) and a Statham Universal Transducing CEU Model UC3 (Gold Cell) as tension sensor to measure tension, and a Hewlett Packard 7035B X-Y Recorder.

The yarn sample was mounted as a loop at a fixed length of 100 mm. A pre-tension was applied to the loop at 0.01 grams/denier. Yarn tensions were measured in a range of 25 to 225° C. at a heating rate of 30° C./min. The peak temperature was the temperature where the tension reached a maximum.

Materials

Isosorbide was obtained from Roquette Freres (Lestrem, France).

1,3-Propanediol was obtained from E. I. du Pont de Nemours and Company, Wilmington, Del.

TA-33-LP Terephthalic acid was obtained from Amoco (Naperville, Ill.).

Trifluoroacetic acid-d ($CF_3COOD$) 99.5 atom % was obtained from Aldrich (Milwaukee, Wis.).

HS-325 SANDOPLAST Red BB, HS-510 SANDOPLAST Blue 2 B, POLYSYNTHREN Blue R, and CLARIANT RSB violet were obtained from Clariant Corporation (Coventry, R.I.).

Dimethyl terephthalate was obtained from Kosa (Wilmington N.C.).

TYZOR LA (an aqueous dihydroxybisammoniumiactato titanium) was obtained from E. I. du Pont de Nemours and Company, Wilmington, Del.

Catalyst A was a catalyst solution prepared by mixing 537 g zinc acetate with 1200 g water to give a solution, adding the solution with manual stirring at room temperature (about 25° C.) to 244 g TYZOR LA (above), and then adding 43 g lactic acid to the solution.

Catalyst B was a catalyst solution prepared by mixing 150 g sodium hypophosphite with 150 g water to give a solution, adding the solution with manual stirring at room temperature (about 25° C.) to 1,000 g TYZOR LA (above).

Example 1

This example demonstrated preparing the polymer of the invention in the form of pellets, solid state polymerization of the pellets, and spinning of the polyester.

To a 2-L stirred stainless steel vessel was added 747.45 g terephthalic acid, 367.08 g 1,3-propanediol, 149.94 g isosorbide, 1.08 mL Catalyst B, 0.27 mL tetramethylammonium hydroxide aqueous solution (25 weight %), 0.0079 g SANDOPLAST Blue 2 B, and 0.0019 g SANDOPLAST Red. The batch temperature was increased to a maximum of 240° C. while water was removed through a column. When 69 g of condensate was removed, the reactor contents were taken down to 2.0 mm Hg (0.27 kPa) for polycondensation at 250° C. The IV was measured as 0.54 and the Tg was 60.4° C. Hunter color values were: L*=69.2, a*=−0.89, and b*=1.64. The isosorbide content was 5.56 mole % and the polymer contained 0.3 mole % DPG.

This polymer was pelletized by extruding under nitrogen pressure through a die to form a strand that was pulled through a cold water trough into a cutter to make ⅛ inch (3.2 mm) pellets. The crystallized pellets were subjected to solid state polymerization for 5 days at 190° C. in a vacuum oven at a vacuum of about 300 mm Hg (39 kPa) under a slow nitrogen stream. The resultant IV after two days was 0.92 dl/g, and the final IV after five days was 1.071 dl/g. The resultant polymer was suitable for use in making shaped articles, such as those described above.

After the solid phase polymerization step, the polymer was dried in a vacuum oven for a minimum of 16 hours at 120° C. The dried polymer was quickly transferred into a nitrogen-blanketed supply hopper maintained at room temperature and fed to a twin screw remelter at 35 g/min. The barrel heating sections were set at 250° C. for zone 1, 260° C. for zones 2 to 8, 260° C. for the pump block, and 265° C. for the pack heaters. To spin 95 denier at 2500 m/min, the metering pump was set at 29.0 g/min and a ballast pump was set at 6 g/min to maintain a total throughput of 35 g/min. The spin metering pump extruded the polymer through a sand filter spin pack and a 34 round hole spinneret having 0.010" (0.25 mm) diameter and 0.040" (1 mm) capillary depth holes maintained at 264° C. The filament streams leaving the spinneret were quenched with air at 21° C., converging to a bundle and spin finish applied. Forwarding rolls with a subsurface speed of 2500 m/min delivered the yarn bundle to an interlace jet and then onto a windup running at 2550 m/min.

Spinning conditions and properties are summarized below in Table 1.

Example 2

The process of Example 1 was repeated. Spinning conditions and properties are summarized in Table 1.

Comparative Example A

This comparative example shows preparation of a 3GT polymer (i.e., without isosorbide) from DMT.

To a 2-liter stirred glass vessel was added 388.40 g dimethyl terephthalate, 197.86 g 1,3-propanediol, and 0.33 mL Catalyst A. The vessel was submerged in a heated oil bath. The batch temperature was increased to a maximum of 2400° C. while methanol was removed through a column. If the overhead vapor temperature exceeded 67° C., the condensate valve closed to prevent the loss of 1,3-propanediol overhead. When 161 mL of a possible 162 mL of methanol had been removed within 5 hours, the reactor contents were taken down to <1 mm Hg (<0.13 kPa) for polycondensation at 260° C. The IV was measured as 0.64 dl/g and the Tg was 47.9° C. Hunter color values were: L*=86.1, a*=0.97, and b*=2.54. The polymer contained no isosorbide and had a DPG content of 0.19 mole %.

The polymer was subjected to solid state polymerization and spun into fibers as for the polymer of Example 1.

Comparative Example B

The process of Comparative Example A was repeated. Spinning conditions and properties are summarized in Table 1.

TABLE 1

| Ex. | Polymer Composition | Spinning/ Winding Speeds (m/min) | Denier | Tenacity (g/d) | Elongation (%) | Tg/Tm (° C.)** |
|---|---|---|---|---|---|---|
| | | Examples | | | | |
| 1 | 5.6 mol % isosorbide in 3GT | 2500/ 2550 | 93.6 | 2.84 | 64.53 | 63.58/ 211.07 |
| 2 | As Ex. 1 | 2500/ 2550 | 95.4 | 2.76 | 65.2 | 59.47/ 213.78 |
| | | Comparative Examples | | | | |
| A | 100% 3GT | 2500/ 2550 | 97.2 | 2.63 | 90.24 | 45.95/ 227.29 |
| B | As A | 2500/ 2550 | 95.4 | 2.68 | 88.80 | 43.87/ 227.54 |

Table 1 shows the Examples have a lower melting point, higher Tg, and higher tenacity, vs. the Comparative Examples. The changes improve the aging stability of the POY.

Example 3

POY Fiber Structure Stability Tests

POY's of Comparative Example A doff 7 and Example 1 doff 10 were used to compare POY fiber structure stability under hot environment. To simulate hot environment, POY packages were exposed to 41° C. heat in an oven for 0, 0.5, 2.5, 17, 48, and 73 hours. Shrinkage-tension was measured using the analyzer described above at a heating rate of 30° C./minute at an initial tension of 0.01 grams/denier. Tensions were characterized in a temperature range of 25–225° C. as shown in Table 2. Peak tensions of 3GT with isosorbide has a 9% drop vs. a 47% drop of peak tensions of 3GT without isosorbide after 73 hours of heating at 41° C. indicating a significantly more stable structure of 3GT with isosorbide.

Glass transition temperature (Tg) was indicated when there was a sudden increase of shrinkage-tension. As shown below, there was a significant Tg shift from 52.4 to 60.2° C. for 3GT without isosorbide and only a slight shift from 59.4 to 61.1° C. for 3GT with isosorbide after 17 hours of heating. The amount of Tg shift is also relatively mild for 3GT with isosorbide compared to 3GT without isosorbide after 48 and 73 hours of heating. A more stable Tg after heating suggests the fiber has a more stable structure after aging under hot environment. Shrinkage-tension, as shown in Table 2, also suggests a more stable structure of 3GT with isosorbide compared to 3 GT without isosorbide.

TABLE 2

Fiber Stability Data

| Heating (hrs.) → Example identity ↓ | 0 | 0.5 | 2.5 | 17 | 48 | 73 |
|---|---|---|---|---|---|---|
| | Example 1 | | | | | |
| Tg, ° C. | 59.0 | 60.7 | 59.4 | 61.1 | 63.5 | 65.8 |
| Shrinkage-tension (%) | 58.6 | 46.3 | 41.8 | 42.2 | 42.1 | 49.7 |
| | Comparative Example A | | | | | |
| Tg, ° C. | 52.9 | 52.2 | 52.4 | 60.2 | 65.1 | 67.9 |
| Shrinkage-tension (%) | 48.6 | 37.3 | 11.4 | 7.8 | 6.4 | 5.5 |

In Table 2, Example 1 showed less change in Tg and greatly reduced shrinkage-tension on prolonged heating, versus the Comparative Example A. Both these properties indicate enhanced stability of the fibers containing isosorbide. Changes in the Tg and higher shrinkage tension indicate crystallization in the fiber was occurring, a change that is associated with undesirable fiber instability on storage. The shrinkage-tension data is depicted in FIG. 1 wherein A indicates Comparative Example A and B indicates Example 1.

Example 4

To a 2-L stirred stainless steel vessel was added 873.90 g dimethyl terephthalate, 367.08 g 1,3-propanediol, 149.94 g isosorbide, 0.75 mL Catalyst A, and 1.8 mL tetramethylammonium hydroxide aqueous solution (25 weight %). The batch temperature was increased to a maximum of 240° C. while methanol was removed through a column. When 288 g of condensate was removed, the reactor contents were taken down to 2.6 mm Hg (0.35 kPa) for polycondensation at a temperature of 250° C. The IV was measured as 0.50 dl/g and the Tg was 63.5° C. Hunter color values were: L*=78.5, a*=0.02, and b*=7.7. The isosorbide content was 5.07 mole % and the polymer contained 0.07 mole % of di-1,3-propylene glycol.

While the invention has been described with respect to specific embodiments, it should be understood that they are not intended to be limiting and that many variations and modifications are possible without departing from the scope of the invention.

What is claimed is:

1. A shaped article comprising poly[(trimethylene-co-dianhydrosugar ester) dicarboxylate] or poly(trimethylene-co-dianhydro-dicarboxylate).

2. The shaped article of claim 1 comprising poly[(trimethylene-co-dianhydrosugar ester) terephthalate] or poly(trimethylene-co-dianhydro-terephthalate).

3. The shaped article of claim 1 having an intrinsic viscosity of from about 0.5 to about 2.5 dl/g.

4. The shaped article of claim 1 which is a fiber, yarn, film, nonwoven, or molded article.

5. The shaped article of claim 4 having a glass transition temperature of at least 55° C.

6. The shaped article of claim 4 having a glass transition temperature of at least 60° C.

7. The shaped article of claim 4 having a glass transition temperature of at least 70° C.

8. The shaped article of claim 4 which is a staple fiber or filament.

9. The shaped article of claim 8 comprising a partially oriented yarn formed from staple fibers.

10. The shaped article of claim 8 comprising a spun drawn yarn formed from staple fibers.

11. The shaped article of claim 8 comprising a spun textured yarn formed from staple fibers.

12. The shaped article of clam 8 wherein the staple fiber further comprises a coloring agent, dye, pigment, delustrant, flame retardant, infrared absorbing agent or UV stabilizer.

13. A fabric comprising the shaped article of claim 9, 10, or 11.

14. The fabric of claim 13 which is a woven fabric.

15. The shaped article of claim 1 further comprising up to about 30 mole percent of a copolymer.

16. The fabric of claim 15 which is a woven fabric.

17. A multifilament yarn comprising a multiconstituent filament of poly(trimethylene-co-dianhydrosugar ester) terephthalate or poly(trimethylene-co-dianhydro-sugar terephthalate).

18. The multifilament yarn of claim 17 wherein the multifilament yarn is a partially oriented yarn.

19. The multifilament yarn of claim 17 wherein the multifilament yarn is a spun drawn yarn prepared by drawing filaments at a drawn speed, as measured as the roller end of the draw step, of about 2500 to about 8000 m/min.

20. The multifilament yarn of claim 17 which is textured by (a) preparing a package of partially oriented yarn, (b) unwinding the yarn from the package, (c) drawing the multiconstituent filaments yarn to form a drawn yarn, (d) false-twist texturing the drawn yarn to form a textured yarn, and (e) winding the yarn onto a package.

21. The multifilament yarn of claim 17 which is textured by (a) preparing a package of spun drawn yarn by drawing filaments at a draw speed, as measured at the roller end of the step, of about 2500 to about 8000 m/m, (b) unwinding the yarn from the package, (c) false-twist texturing the drawn yarn to form a textured yarn, and (d) winding the yarn onto a package.

22. A fabric comprising the multifilament yarn of claim 18, 19, 20 or 21.

23. The multifilament yarn of claim 17 in the form of a bulked continuous filament.

24. A carpet comprising the multifilament yarn of claim 23.

25. The multifilament yarn of claim 17 further comprising a coloring agent, infrared absorbing agent, or UV stabilizer.

26. A shaped article comprising poly[(trimethylene-co-dianhydrosugar ester) terephthalate].

27. The shaped article of claim 26 which is a fiber.

28. The shaped article of claim 26 which is a film.

29. The shaped article of claim 26 which is a molded article.

30. The shaped article of claim 26 wherein the poly [(trimethylene-co-dianhydrosugar ester) terephthalate] is formed from (a) 1,3-propane diol; (b) terephthalic acid or its alkyl esters; (c) about 3 to about 20 mole % isosorbide, based on the poly[(trimethylene-co-dianhydrosugar ester) terephthalate); (d) optionally up to 15 mole % other 3 to 12 carbon atoms aliphatic diols, based on the poly[(trimethylene-co-dianhydrosugar ester) terephthalate](e) optionally up to about 15 mole % other diacids or diesters, based on the poly[(trimethylene-co-dianhydrosugar ester) terephthalate]; and (9 optionally up to 15 molar equivalents of other anhydrosugar alcohols may be used, based on isosorbide; and wherein the molar ratio of 1,3-propane diol and other diols:terephthalic acid and its alkyl esters and dicarboxylic acid or its alkyl esters is from about 1.1:1 to about 1.6:1 and the molar ratio of 1,3-propane diol and other diols:isosorbide and anhydrosugar alcohols is from about 2:1 to about 10:1.

31. A shaped article comprising poly(trimethylene-co-dianhydro-terephthalate).

32. The shaped article of claim 31 which is a fiber.

33. The shaped article of claim 31 which is a film.

34. The shaped article of claim 31 which is a molded article.

35. The shaped article of claim 31 wherein the poly (trimethylene-co-dianhydro-terephthalate) is prepared by first preparing an ester bridging moiety by reacting isosorbide with terephthalic acid or its dialkyl ester, and then by polycondensing the ester bridging moiety with a poly(trimethylene terephthalate) oligomer.

36. The shaped article of claim 35 wherein the prepolymer has an inherent viscosity of from about 0.02 to about 0.06dl/g.

* * * * *